(12) United States Patent
Niewels

(10) Patent No.: US 8,360,768 B2
(45) Date of Patent: Jan. 29, 2013

(54) POST-MOLD PREFORM RECEPTACLE AND A POST-MOLD TREATMENT DEVICE

(75) Inventor: Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 312 days.

(21) Appl. No.: 12/933,970

(22) PCT Filed: Mar. 19, 2009

(86) PCT No.: PCT/CA2009/000305
§ 371 (c)(1),
(2), (4) Date: Sep. 22, 2010

(87) PCT Pub. No.: WO2009/132419
PCT Pub. Date: Nov. 5, 2009

(65) Prior Publication Data
US 2011/0033569 A1 Feb. 10, 2011

Related U.S. Application Data

(60) Provisional application No. 61/048,982, filed on Apr. 30, 2008.

(51) Int. Cl.
B29C 49/64 (2006.01)

(52) U.S. Cl. .................................. 425/526; 425/547

(58) Field of Classification Search ............ 425/526, 425/547
See application file for complete search history.

(56) References Cited

U.S. PATENT DOCUMENTS

| 5,514,309 | A | 5/1996 | Williamson et al. |
| 6,391,244 | B1 * | 5/2002 | Chen .............................. 425/526 |
| 6,737,007 | B2 * | 5/2004 | Neter et al. .................... 264/538 |
| 6,957,954 | B2 | 10/2005 | Neter et al. |
| 2004/0247734 | A1 | 12/2004 | Unterlander et al. |
| 2004/0258791 | A1 | 12/2004 | Neter et al. |
| 2006/0204605 | A1 * | 9/2006 | Neter et al. .................... 425/526 |
| 2006/0204608 | A1 * | 9/2006 | Neter et al. .................... 425/547 |
| 2007/0264385 | A1 * | 11/2007 | McCready et al. ............ 425/547 |
| 2010/0001439 | A1 * | 1/2010 | Bock .............................. 425/526 |

FOREIGN PATENT DOCUMENTS

WO 2007143815 A1 12/2007

* cited by examiner

*Primary Examiner* — Robert B Davis
(74) *Attorney, Agent, or Firm* — Husky Intellectual Property Services

(57) ABSTRACT

Embodiments of the present invention teach a post-mold treatment device and post-mold preform receptacle for use therewith for a post-mold treatment of a preform having a bell-shape. More particularly, an upper portion of a receptacle cavity associated with the post-mold preform receptacle is configured to have the same shape as the transition portion of the preform, and the upper portion is further configured to have a transition-fit size with respect to the transition portion of the preform at the instant that the preform is received from the molding cavity of the injection mold.

7 Claims, 2 Drawing Sheets

POST-MOLD PREFORM RECEPTACLE AND A POST-MOLD TREATMENT DEVICE

TECHNICAL FIELD

The present invention generally relates to, but is not limited to molding systems in general and more specifically, but not limited to, a post-mold preform receptacle and a post-mold treatment device.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes, amongst other things, an injection unit, a clamp assembly and a mold assembly. The injection unit can be of a reciprocating screw type or of a two-stage type. The clamp assembly includes, amongst other things, a frame, a movable platen, a fixed platen and an actuator for moving the movable platen and to apply tonnage to the mold assembly arranged between the fixed and movable platens. The mold assembly includes, amongst other things, a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, the injection molding of a preform, of the type that is later blow molded into a bottle, typically involves the heating of a molding material, such as, for example, PET, to a homogeneous molten state and injecting, under pressure, the so-melted molding material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core plates together against the pressure of the injected molding material. The molding cavity has a shape that substantially corresponds to a final cold-state shape of the molded article to be molded. The so-injected molding material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

One consideration for economical operation of the molding system is cycle time or, in other words, time that elapses between a point in time when the cavity and core halves are closed and the molded articles are formed and a subsequent point in time when they are opened and the molded articles are removed. As one will appreciate, the shorter the cycle time, the higher the number of molded articles that can be produced in a particular mold of a given size in a given time interval. Accordingly, injection molding systems are commonly provided with one of more post-mold treatment devices wherein a so-called "post-mold treatment" process is performed for sake of minimizing the molding cycle time and/or for ensuring that the molded article produced remains substantially defect free. Generally speaking, the post-mold treatment process involves transferring the molded articles from the mold, once they are sufficiently cooled to enable ejection thereof, to the post-mold treatment device. A post-mold treatment of the molded articles, commonly the continued cooling thereof, then ensues in the post-mold treatment device. The post-mold treatment generally occurs independently (but in parallel) to the injection cycle of the molding machine.

An example of the post-mold treatment device is disclosed in a commonly assigned U.S. Pat. No. 7,104,780 issued to Domodossola et al. on Sep. 12, 2006. More specifically, Domodossola et al. discloses a post-mold treatment device that is mounted to a platen of an injection molding machine, the post-mold treatment device being configured for handling and cooling molded articles received from an injection mold.

It is quite common to equip the post-mold treatment device, such as those provided with preform molding systems from Husky Injection Molding Systems Limited, with a so-called take-off plate having an arrangement of post-mold preform receptacles with which the molded articles are to be received from the mold. Such post-mold preform receptacles are generally configured in accordance with the teachings of commonly assigned U.S. Pat. No. 4,729,732 issued to Schad et al. on Mar. 8, 1988. The foregoing '732 patent describes the post-mold preform receptacle as a carrying means for holding and cooling a heated parison (i.e. preform) therein. The carrying means having an open forward end for receiving the parison, a closed rearward end, a longitudinal wall between the forward and rearward ends with an internal surface tapering inwardly towards the closed end. There is also a cooling means adjacent the longitudinal surface. The internal surface is smaller than the heated parison, the parison also having a corresponding taper so that the cooling means is operative to shrink the parison upon cooling with the parison sliding inside the tube to fit snugly therein. The carrying means further including suction means adjacent the closed end for maintaining the cooled parison inside the tube.

Another patent that describes a post-mold preform receptacle for use with a post-mold device is commonly assigned U.S. Pat. No. 7,264,464 issued to Unterlander et al. on Sep. 4, 2007. The '464 patent reviews, amongst other things, the common general knowledge that those skilled in the art will appreciate the selection of an relation to be applied to the inner mating surface varies as a function of the shape of the preform and the related injection molding process.

A recently published post-mold treatment process for post-mold cooling of molded articles, such as preforms and the like, is described in commonly assigned PCT patent publication 2007/143815 to Niewels published on Dec. 21, 2007, and henceforth referred to in this specification as the "balanced cooling rate post-mold treatment process". The process involves a post-mold cooling of a molded article, such as a preform, the molded article having just been molded within mold halves of a mold. The process includes receiving, in a post-mold device, the molded article and subjecting the molded article to post-mold cooling. The post-mold cooling including balancing cooling rates during the post-mold cooling so that the molded article reaches a target exit temperature at a point of time that substantially coincides with a point of time when the molded article is removed from the post-mold cooling, the target exit temperature that substantially precludes post-ejection defects. Put another way, the process moves away from the main stream thought of simply cooling a received portion of the molded article as aggressively as possible to a process of controlling a cooling rate imposed on various portions of the molded article.

SUMMARY OF THE INVENTION

According to a first broad aspect of the present invention, there is provided a post-mold preform receptacle for treatment of a preform received therein in accordance with a balanced cooling rate post-mold treatment process, the preform having a bell-shape that includes a transition portion connecting a neck finish portion with a body portion. The post-mold preform receptacle including a body that defines a receptacle cavity for accepting, in use, the transition portion and the body portion of the preform. A lower portion of the receptacle cavity is configured to have the same shape as the body portion of the preform, and the lower portion being further configured to have a body-interference size with respect to the body portion of the preform at an instant that the preform is received from a molding cavity of an injection mold. An upper portion of the receptacle cavity is configured to have the same shape as the transition portion of the preform, and the upper portion being further configured to have a transition-fit size with respect to the transition portion of the preform at the same instant that the preform is received from the molding cavity of the injection mold whereby there is contact between the transition portion and the upper portion.

According to a second broad aspect of the present invention there is provided a post-mold treatment device including the foregoing post-mold preform receptacle.

BRIEF DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and are may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE PREFERRED EMBODIMENT(S)

Figures 2, 3:
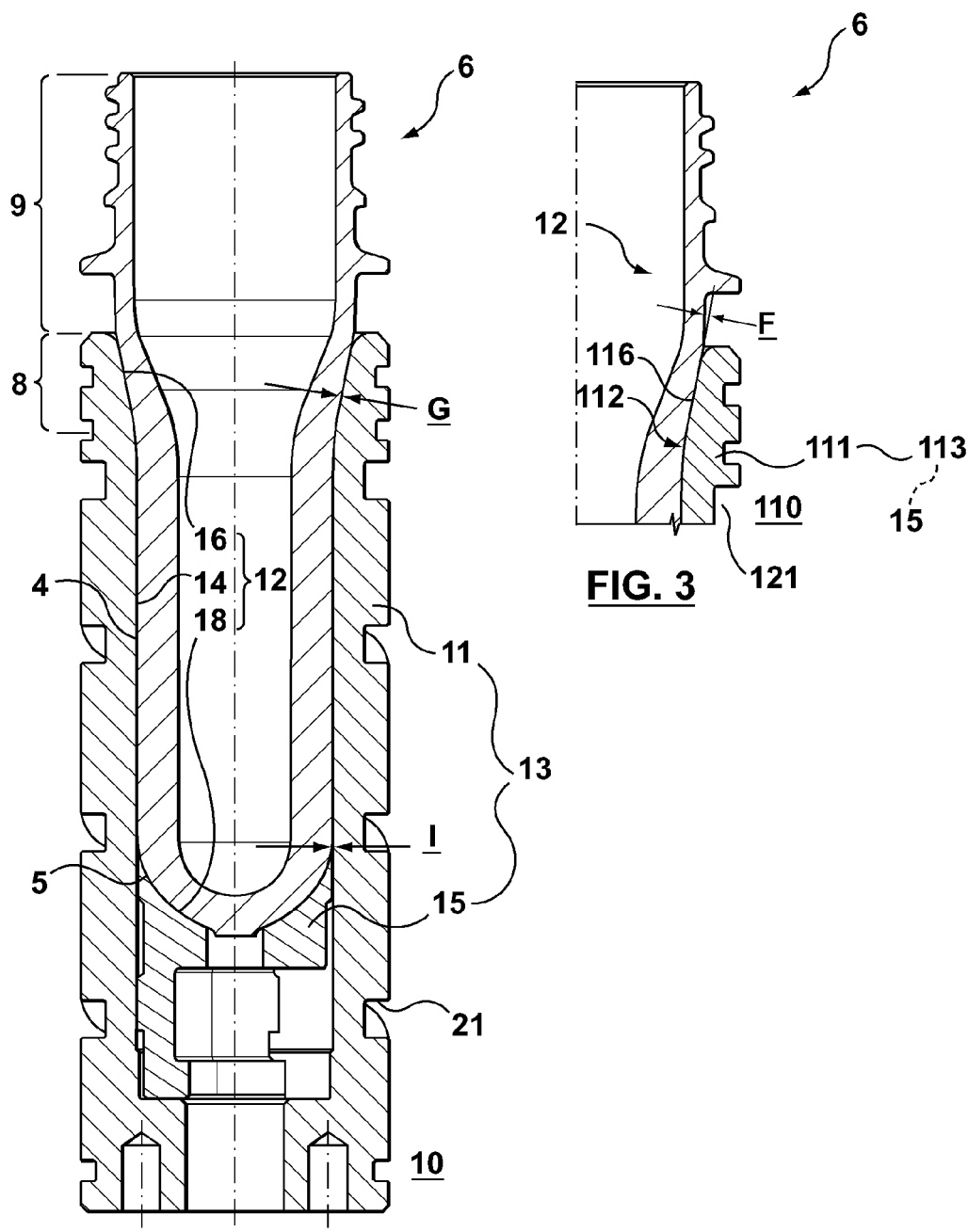
FIG. 2 depicts a post-mold preform receptacle configured in accordance with common general knowledge of the skilled person.
FIG. 3 depicts a post-mold preform receptacle implemented in accordance with a non-limiting embodiment of the present invention.

With reference to FIG. 2, herein, a post-mold preform receptacle 10 is shown that has been configured generally in accordance with common general knowledge of one skilled in the art. A molded article, in this case a preform 6, is also shown, the preform 6 being in a fully-engaged position within a receptacle cavity 12 that is defined by inner surfaces of the post-mold preform receptacle 10. The preform 6 is shown as including a neck finish portion 9, a transition portion 8 that connects the neck finish portion 9 with a body portion 4, and lastly a domed-end portion 5. The preform 6 is further characterized by the steep-angled conical shape of the transition portion 8, as compared with the more tubular shape of the body portion 4. More particularly, the transition portion 8 inwardly slopes (relative to a longitudinal axis of the preform towards a closed-end portion 18 thereof) at a relatively steep draft angle in comparison with that of the body portion 4, which is, in the present example, about 10 degrees versus about 1 degree, respectively. The preform 6 has an overall shape that is not unlike a bell-shape, and hence those skilled in the art generally classify preforms such as this as a "bell-shaped preform". Of course, those skilled in the art would recognize that there are many examples of bell-shaped preforms having a similar angular relationship between the transition portion and the body portion as the foregoing example but with widely varying angular values.

The receptacle cavity 12 of the post-mold preform receptacle 10 is typically configured such that during normal operation the preform 6 does not reach the fully-engaged position within the receptacle cavity 12 until the preform 6 has shrunk in size from a contact cooling therewith. To accomplish the foregoing the lower portion 14 of the receptacle cavity 12 is configured to have generally the same shape as the body portion 4 of the preform 6, in addition, a "body-interference size" is provided wherein the lower portion 14 defines a space that is slightly dimensionally smaller than the body portion 4 of the preform 6, at an instant that the preform 6 is first received after ejection from the molding cavity (not shown) of the injection mold (not shown). The foregoing body-interference size is conceptually represented at indicia "I" in FIG. 2 relative to the dimension of a portion of the molding cavity corresponding to the body portion 4 of the preform 6. That is, the lower portion 14 of the receptacle cavity 12 is the same shape and smaller than the corresponding portion of the molding cavity within the injection mold.

Likewise, an upper portion 16 of the receptacle cavity has generally the same shape as the transition portion 8 of the preform 6, but in contrast to the lower portion 14 the upper portion 16 is further configured to include a "transition-clearance size" wherein the upper portion 16 defines a space that is slightly dimensionally larger than the body portion 4 of the preform 6, at an instant that the preform 6 is first received after ejection from the molding cavity (not shown) of the injection mold (not shown). The foregoing transition-clearance size is conceptually represented at indicia "G" in FIG. 2 relative to the dimension of a portion of the molding cavity corresponding to the transition portion 8 of the preform 6.

The shape of a closed-end portion 18 of the receptacle cavity 12 is typically configured to have the same shape and size as the portion of the injection mold that corresponds to the domed-end portion 5 of the preform 6.

As shown in FIG. 2, the post-mold preform receptacle 10 includes a body 13 along which surfaces the receptacle cavity 12 is defined, the body 13 being an assembly of a tube member 11 and an insert member 15 received therein. The upper portion 16 and the lower portion 14 of the receptacle cavity are defined on inner surfaces of the tube member 11. The closed-end portion 18 is defined on the insert member 15. Also shown, the tube member 11 also defines a channel 21 for the circulation, in use, of a coolant.

The foregoing difference in dimensional relationship between the upper portion 16 and lower portion 14 of the receptacle cavity 12 in relation to the transition portion 8 and body portion 4, respectively, is typically employed to ensure that contact between the domed-end portion 5 of the preform 6 and the closed-end portion 18 of the receptacle cavity is achieved prior to contact, if any, between the upper portion 16 and the transition portion 8 of the preform 6.

Experiments were undertaken by the inventor involving an injection molding system that included a post-mold device having the post-mold preform receptacle 10 for producing the preform 6 with the bell-shape. The results of the experiments were unsatisfactory with the preform 6 so-processed being rendered defective by virtue of sink marks imparted in the transition portion 8 thereof. In order to process out the defects the in-mold (i.e. injection mold) cooling time had to be considerably lengthened.

The inventor has discovered a novel configuration of a preform receptacle that when used in conjunction with the balanced cooling rate post-mold treatment process of the '815 publication has the technical effect of mitigating the foregoing defect issues associated with the preform 6 without having to resort to undue lengthening of the in-mold cooling time. A post-mold preform receptacle 110 in accordance with a non-limiting embodiment of the present invention is shown with reference to FIG. 3.

The post-mold preform receptacle 110 is very much the same as the post-mold preform receptacle 10. As shown, the post-mold preform receptacle 110 includes a body 113 along which surfaces the receptacle cavity 112 is defined, the body 113 being an assembly of a tube member 111 and the insert member 15 (FIG. 2) of the post-mold preform receptacle 10. The tube member 111 is the same as the tube member 11 (FIG. 2) of the post-mold preform receptacle 10 except for a configuration of an upper portion 116 of a receptacle cavity 112 that is defined thereon, a description of which follows. Also shown in FIG. 3, the tube member 111 includes a channel 121 for the controllable circulation, in use, of a coolant for regulating a first cooling rate associated with at least the transition portion 8 of the preform 6 (i.e. the portion of the preform received in the post-mold preform receptacle of the post-mold device). In the present non-limiting embodiment the first cooling rate is also associated with the body portion 4 of the preform. The regulating of the first cooling rate is done to effect a balancing of the first cooling rate with respect to a second cooling rate associated with one of the neck finish portion 9 of the preform 6 (i.e. the portion of the preform not received in the post-mold preform receptacle of the post-mold device), or the interior portion 19 of the preform.

In the present non-limiting embodiment the upper portion 116 of the receptacle cavity 112 is configured to have generally the same shape as the transition portion 8 of the preform 6. In addition, a "transition-fit size" is provided along the upper portion 116 wherein the upper portion 116 defines a space that is the same size as, to slightly dimensionally smaller than, the transition portion 8 of the preform 6 at an instant that the preform 6 is first received after ejection from the molding cavity (not shown) of the injection mold (not shown). Accordingly, in the present non-limiting embodiment there would be a transition-fit size as conceptually represented at indicia "F" in FIG. 3 relative to a portion of the molding cavity corresponding to the transition portion 8 of the preform 6. That is, the upper portion 16 of the receptacle cavity 12 is the same shape and size, to slightly smaller than, the corresponding portion of the molding cavity within the injection mold. Surprisingly, configuring the transition-fit size along the upper portion 116 of the receptacle cavity 112 had a desirable technical effect of mitigating the defects in the preform 6 that were noted in relation to the post-mold treatment of the preform 6 with the post-mold preform receptacle 10.

Alternative non-limiting embodiments of the post-mold preform receptacle (not shown) are possible. Such alternative non-limiting embodiments of the post-mold preform receptacle may be configured, for example, to be similar to the post-mold preform receptacle 110 of FIG. 3 with variations made to the upper portion 116. In the brief description of the alternative non-embodiments that follows, reference will be made to the features of the non-limiting embodiment of FIG. 3. In the alternative non-limiting embodiments the upper portion 116 of the receptacle cavity 112 are configured to have generally the same shape as the transition portion 8 of the preform 6. In addition, a transition-fit size F is applied along the upper portion 116 thereof, the transition-fit size may be selected from a range. A lower end of the range may be, for example, a size that is smaller than the size of the corresponding portion of the molding cavity by 50% of a difference between the size of the corresponding portion of the molding cavity and a size of a corresponding portion of the preform 6 at ambient temperature (i.e. inward offset of 50%). An upper end of the range may be, for example, a size that corresponds to the size of the corresponding portion of the molding cavity (i.e. inward offset of 0%). An example of the foregoing alternative non-limiting embodiments had an transition-fit size F with an inward offset of 20%. Accordingly, the transition-fit size F may include an inward offset that ranges, for example, between 0 and 50%, and further may be about 20%.

The patentee believes that the foregoing configuration of the upper portion 116 to include the transition-fit size F runs contrary to the common general knowledge of the skilled person discussed previously. That is, contact between the upper portion 116 and the transition portion 8 of the preform 6 is achieved at the same time, or prior to, contact between the domed-end portion 5 of the preform 6 and the closed-end portion (not shown) of the receptacle cavity 112.

Figure 1:
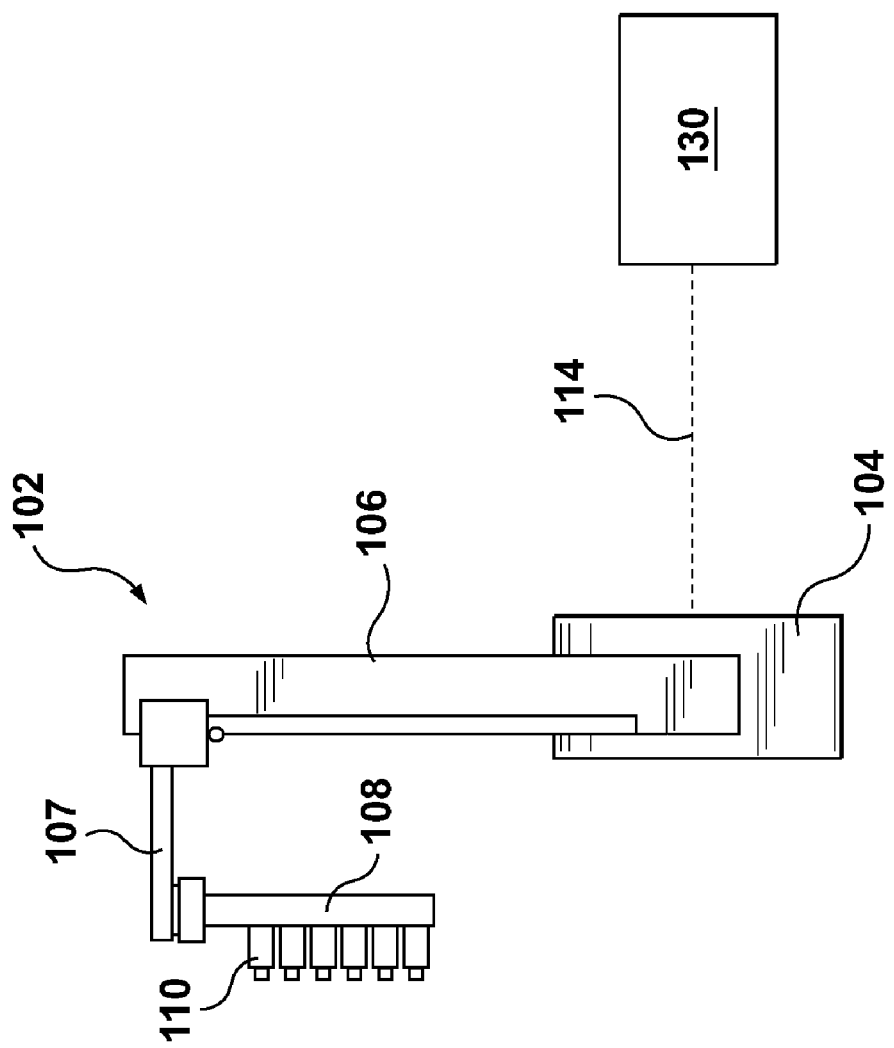
FIG. 1 depicts a non-limiting embodiment of a post-mold treatment device, which can be used to implement embodiments of the present invention.

With reference to FIG. 1, there is depicted a non-limiting embodiment of a post-mold treatment device 102, which can be adapted to implement embodiments of the present invention. More specifically, FIG. 1 depicts a platen 104 and the post-mold treatment device 102 being operatively coupled to the platen 104. Those skilled in the art will readily appreciate how the post-mold treatment device 102 can be operatively coupled to the platen 104 and, as such, this will not be discussed here at any length.

For illustration purposes only, it shall be assumed that the platen 104 is part of an injection molding system (not depicted) adapted for processing molding material, such as, PET for example, to produce preforms that are subsequently blow-molded into beverage containers (such as, bottles, for example). The injection molding system may be, for example, a HYPET (a trademark of Husky Injection Molding Systems Limited) preform system from Husky Injection Molding Systems Limited. However, it should be understood that in alternative non-limiting embodiments of the present invention, the platen 104 can be part of other types of molding systems, such as, but not limited to, compression molding systems, molding systems adapted for molding preforms using other materials and the like.

The post-mold treatment device 102 comprises a mounting structure 106, an actuating arm 107 coupled to the mounting structure 106 and a take-off plate 108 coupled to the actuating arm 107. The take-off plate 108 further comprises a plurality of the post-mold preform receptacles 110 arranged thereon. Generally speaking, the purpose of the plurality of post-mold preform receptacles 110 is (a) to remove molded articles after they have been produced and sufficiently cooled within one or more molding cavities (not depicted) of the molding system (not depicted); and (b) implement at least a portion of the post-mold treatment process.

The exact number of the plurality of post-mold preform receptacles 110 is not particularly limited and will generally correspond to the number of the one or more molding cavities (not depicted) or a multiple number thereof (which is some times referred to by those of skill in the art as a "multi-position post-mold treatment or cooling process"). For example, if a three-position post-mold treatment cycle is to be implemented and if the molding system comprises 72 instances of the one or more molding cavities (for example, 12 rows of 6), the take-off plate 108 can comprise 216 instances of the plurality of post-mold preform receptacles 110 (i.e. twelve rows of 18). Other configurations are, of course, also possible and are generally limited by business considerations of an entity managing the molding system.

Also schematically depicted in FIG. 1 is a computing apparatus 130. The computing apparatus 130 can be configured to control one or more operation of the molding system (not depicted) in general and the post-mold treatment device 102, in particular. To that extent, there is schematically shown a connection 114 between the computing apparatus 130 and the platen 104. The computing apparatus 130 can be implemented as part of a controller that controls various operations of the molding system. Alternatively, the computing apparatus 130 can be implemented as a separate computing device configured to control only certain operations or operations of a certain component of the molding system (ex. the post-mold treatment device 102). The computing apparatus 130 can comprise internal memory (not depicted) storing one or more instructions for executing one or more routines or a reader (not depicted) for reading one or more type of a computer-readable medium (not depicted) that stores one or more instructions for executing one or more routines.

Even though the connection 114 is depicted between the computing apparatus 130 and the platen 104, this need not be so in every embodiment of the present invention. Accordingly, it should be understood that the computing apparatus 130 can be coupled to other components of the molding system (not depicted), as well as to more than one component of the molding system, either in series or in parallel. Furthermore, it should be understood that the connection 114 can be implemented either as a wireless link, a wired link or as a combination of the two.

It should be further understood that alternative non-limiting embodiments of the present invention are possible as would be apparent to those skilled in the art. For example, a alternative post-mold treatment device (not shown) may be provided, either coupled to the molding machine or downstream thereto, that includes an arrangement of the post-mold preform receptacles (like the post-mold preform receptacle 110 depicted in FIG. 3) and a preform pressurization structure for a pressurization of an inner portion of preforms (like the preform 6 depicted in FIG. 2) that are receivable within the post-mold preform receptacles. The pressurization of the inner portion of the preforms may have the technical effect of keeping an outer portion of the preforms in contact with a corresponding surface of the receptacle cavity (like the receptacle cavity 112 depicted in FIG. 3) while the preforms are being cooled therein. The foregoing preform pressurization structure may be, for example, as disclosed in a commonly assigned U.S. Pat. No. 6,817,855 issued to Unterlander et al. on Nov. 16, 2004. A further example of the preform pressurization structure may include the CALITEC (a trademark of Netstal-Maschinen AG) post-mold cooling technology from Netstal-Maschinen AG. Similarly, those skilled in the art would further recognize that the post-mold preform receptacle (like the post-mold preform receptacle 110 depicted in FIG. 3) may be retrofitted for use with the COOL-MAX (a trademark of MHT AG) post-mold cooling technology from MHT AG.

The description of the embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the embodiments, it will be apparent that modifications and enhancements are possible without departing from the concepts as described. Therefore, what is to be protected by way of letters patent are limited only by the scope of the following claims:

What is claimed is:

1. A combination of a post-mold preform receptacle for treatment of a preform received therein in accordance with a balanced cooling rate post-mold treatment process and the preform, the preform having a bell-shape that includes a transition portion connecting a neck finish portion with a body portion, the post-mold preform receptacle comprising:
    a body that defines a receptacle cavity for accepting, in use, the transition portion and the body portion of the preform;
    a lower portion of the receptacle cavity being configured to have the same shape as the body portion of the preform, and the lower portion being further configured to have a body-interference size (I) with respect to the body portion of the preform at an instant that the preform is received from a molding cavity of an injection mold;
    an upper portion of the receptacle cavity being configured to have the same shape as the transition portion of the preform, and the upper portion being further configured to have a transition-fit size, with respect to the transition portion of the preform at the same instant that the preform is received from the molding cavity of the injection mold whereby there is contact between the transition portion and the upper portion, wherein the upper portion defines a space that is slightly dimensionally smaller than the transition portion of the preform at an instant that the preform is first received after ejection from the molding cavity of the injection mold.

2. The post-mold preform receptacle of claim 1, wherein the post-mold preform receptacle further includes channel for a controllable circulation, in use, of a coolant for regulating a first cooling rate associated with at least the transition portion of the preform to effect a balancing of the first cooling rate with respect to a second cooling rate associated with at least one of:
    the neck finish portion of the preform; and
    an interior portion of the preform.

3. The post-mold preform receptacle of claim 2, wherein:
    the post-mold preform receptacle further defines a closed-end portion of the receptacle cavity for receiving, in use, a domed-end portion of the preform, and wherein the closed-end portion is typically configured to have the same shape and size as a portion of the injection mold that corresponds to the domed-end portion of the preform.

4. The post-mold preform receptacle of claim 3, wherein:
    the post-mold preform receptacle is an assembly of a tube member and an insert member received therein, and wherein the upper portion and the lower portion of the receptacle cavity are defined on inner surfaces of the tube member and the closed-end portion is defined on the insert member, and that the channel is associated with the tube member.

5. The post-mold preform receptacle of claim 1, wherein: the transition-fit size is selected to include an inward offset that ranges between 0 and 50%.

6. The post-mold preform receptacle of claim 5, wherein: the transition-fit size is selected to include the inward offset of about 20%.

7. A post-mold treatment device including the post-mold preform receptacle of claim 1.

* * * * *